United States Patent [19]
Robinson et al.

[11] Patent Number: 5,744,421
[45] Date of Patent: Apr. 28, 1998

[54] MONOLITHIC CARBONACEOUS ARTICLE

[75] Inventors: Ken K. Robinson, St. Charles; Rodney L. Mieville, Glen Ellyn, both of Ill.

[73] Assignee: Mega-Carbon Company, St. Charles, Ill.

[21] Appl. No.: 600,882

[22] Filed: Feb. 13, 1996

[51] Int. Cl.$^6$ .................................................. B01J 20/02
[52] U.S. Cl. ........................... 502/416; 502/402; 502/400
[58] Field of Search ................................ 502/416, 402, 502/400

[56] References Cited

U.S. PATENT DOCUMENTS

| | | | |
|---|---|---|---|
| 1,899,339 | 2/1933 | Klebert. | |
| 3,352,788 | 11/1967 | Conlisk | 252/161 |
| 3,391,234 | 7/1968 | Walenciak et al. | 264/117 |
| 3,901,823 | 8/1975 | Dimitri et al. | 252/428 |
| 3,951,859 | 4/1976 | Inaba et al. | 252/430 |
| 3,960,761 | 6/1976 | Burger et al. | 252/421 |
| 3,969,124 | 7/1976 | Stewart | 106/56 |
| 3,976,055 | 8/1976 | Monter et al. | 128/2.06 |
| 3,978,000 | 8/1976 | Schmitt, Jr. et al. | 252/447 |
| 4,000,236 | 12/1976 | Redfarn et al. | 264/112 |
| 4,076,892 | 2/1978 | Fennimore et al. | 428/407 |
| 4,082,694 | 4/1978 | Wennerberg et al. | 252/444 |
| 4,124,529 | 11/1978 | Juntgen et al. | 252/421 |
| 4,233,191 | 11/1980 | Reuter et al. | 252/511 |
| 4,242,226 | 12/1980 | Siren | 252/422 |
| 4,374,941 | 2/1983 | Sandstrom | 523/206 |
| 4,518,704 | 5/1985 | Okabayashi et al. | 502/80 |
| 4,551,267 | 11/1985 | Fushimi et al. | 252/511 |
| 4,677,086 | 6/1987 | McCue et al. | 502/62 |
| 4,717,513 | 1/1988 | Lewis et al. | 502/63 |
| 4,717,595 | 1/1988 | Watanabe et al. | 427/221 |
| 4,795,735 | 1/1989 | Liu et al. | 502/415 |
| 4,857,243 | 8/1989 | Von Blucher et al. | 264/13 |
| 5,306,675 | 4/1994 | Wu et al. | 502/5 |
| 5,331,037 | 7/1994 | Koslow | 524/496 |
| 5,389,325 | 2/1995 | Bookbinder et al. | 264/177.12 |
| 5,543,096 | 8/1996 | Wu | 264/63 |

FOREIGN PATENT DOCUMENTS

| | | | |
|---|---|---|---|
| 1121474 | of 1868 | United Kingdom | C08F 29/02 |
| 1144325 | 4/1969 | United Kingdom | C08F 45/08 |

*Primary Examiner*—Glenn Caldarola
*Assistant Examiner*—In Suk Bullock
*Attorney, Agent, or Firm*—Olson & Hierl, Ltd.

[57] ABSTRACT

A highly adsorbent, temperature-resistant monolithic activated carbon article is obtained by forming an aqueous emulsion of a silsesquioxane binder, combining the resulting aqueous emulsion with wet or dry, relatively high surface area (>2000 m$^2$/g) carbon particles to produce a slip mixture, forming the obtained slip mixture into a shaped structure, and thereafter curing the shaped structure.

26 Claims, No Drawings

MONOLITHIC CARBONACEOUS ARTICLE

TECHNICAL FIELD OF THE INVENTION

The present invention relates to activated carbon articles of manufacture. More particularly, this invention relates to temperature-resistant activated carbon monoliths having a relatively high surface area.

BACKGROUND OF THE INVENTION

Activated carbon is an excellent adsorbent. Activated carbon is commercially available in various forms, including granules and powders. In some applications of activated carbon, void spaces between carbon particles are important both for ensuring sufficient adsorbate contact and allowing fluid to pass through the carbon adsorbent without encountering an excessive pressure drop. In other applications, however, the void space is not a principal concern. In the storage of hydrogen, ammonia, or natural gas, for example, carbon adsorption is most efficient on a volume basis when the carbon is formed into a high-density block with most of the void volume between the individual particles greatly reduced or even eliminated.

Efforts at creating such high-density solid structures are reflected in techniques developed for compaction and binding activated carbon particles. For example, U.S. Pat. No. 4,000,236 to Redfarn et al. discloses a method for making a conglomerated activated carbon mass by means of a polymer rendered adhesive by a solvent. U.S. Pat. No. 5,306,675 to Wu is directed to a method for producing activated carbon structures using methyl cellulose binders and microwave radiation curing.

These and other conventional techniques suffer from one or more serious drawbacks as follows: loss of surface area, corrupted pore distribution, limited temperature resistance, overly fragile green state, and high manufacturing costs. The carbon structures produced utilizing such methods also tend to have reduced surface area, lower adsorption capacity, and an undesirable pore size distribution. Furthermore, these carbon structures are not temperature-resistant, but tend to disintegrate when subjected to elevated temperatures.

Conventional binding techniques in particular cause a significant loss in available surface area for the activated carbon particles. With heretofore available techniques, binding and related agents are known to plug pores of the activated carbon particles whereby the favorable pore-size distribution of the original carbon particles is corrupted in favor of undesirably larger pore sizes.

In addition to reduced surface area, the thermal stability of carbon structures made by conventional techniques is inadequate for many otherwise appropriate applications. In adsorption systems, for example, regeneration of spent adsorbent requires elevated temperatures, often exceeding 300° C. Consequently the carbon structure has to be stable under these and possibly more hostile conditions.

Most polymeric binders are not stable at such elevated temperatures, however. Efforts at using high-temperature polymeric resins have generally failed heretofore because only carbon structures with surface areas greatly reduced from those of the original carbon particles could be produced.

Inorganic binders also have been used as binders in carbon mixtures to impart strength and thermal stability. For example, U.S. Pat. No. 4,518,704 to Okabayashi et al. describes a process for making activated carbon bodies using a clay binder. Unfortunately, a very expensive sintering step is required for such inorganic binders, e.g. firing at 900° C. in an inert atmosphere. Furthermore, the mechanical strength of such bodies is inadequate for many applications.

Many uses for activated carbon require that the adsorbent fit into canisters and other devices of varying shapes and sizes. Such potential applications for temperature-resistant activated carbon articles of manufacture thus far have gone unrealized because the required shapes and sizes for the solid articles could not be obtained. Standard binding methods for creating temperature-resistant structures often do not permit molding into unique shapes and sizes because the uncured, or green state, of the structure is either too fragile or too inflexible, thereby limiting workability.

Thus, there continues to be a need for improved temperature-resistant activated carbon structures as well as for methods for making such activated carbon structures.

SUMMARY OF THE INVENTION

A highly adsorbent, temperature-resistant monolithic activated carbon article is obtained by forming a slip mixture constituted by activated carbon particles having a surface area in excess of about 2000 $m^2$/gram and an aqueous emulsion of a silsesquioxane binder, forming the obtained slip mixture into a shaped structure, and thereafter curing the structure.

The monolithic activated carbon article produced in the foregoing manner exhibits substantially no change in compressive strength upon heating to 350° C. and consists essentially of active carbon and a silsesquioxane binder present in an amount up to about 20 percent, based on the weight of the composition. The monolithic activated carbon article has an open pore structure, a surface area in excess of about 2000 $m^2$/g of article, a pore size distribution such that at least 50 percent of total pore volume is constituted by pores less than about 2 nanometers in diameter and at least about 80 percent of total pore volume by pores less than about 4 nanometers diameter. The monolithic activated carbon article has a bulk density of at least about 0.25 grams/cubic centimeter.

DESCRIPTION OF THE PREFERRED EMBODIMENTS

While this invention is susceptible of embodiment in many different forms, there will be described herein in detail specific embodiments with the understanding that the present disclosure is to be considered as an exemplification of the principles of the claimed invention and is not to be limited to the specific embodiments illustrated.

The temperature-resistant monolithic article of the present invention consists essentially of activated carbon particles bonded together with a silsesquioxane binder while maintaining an open pore structure. The monolithic article is formed by activated carbon particles having a surface area greater than about 2000 $m^2$/g and pores preloaded with water, which particles are then combined with a silsesquioxane binder to form a slip mixture which is then cured. The preloading of pores can be effected either by prewetting the carbon particles with water or by combining the particles with an aqueous emulsion of silsesquioxane binder. Prewetting with water is preferred.

The resulting mass is a slip mixture which is then formed to a desirable shape by manipulation such as molding or extrusion. The article is then cured to a rigid shape by heating. Suitable emulsifying and rheology modulating agents may be added to the slip mixture as necessary to achieve a desired consistency.

The solid monolithic articles of the present invention made in the foregoing manner exhibit relatively high adsorption capacity as well as relatively high compressive strength of the order of about 500 psi, or higher, at temperatures up to 350° C.

The principal ingredient of the present invention is activated carbon. Activated carbon is a non-graphitic microcrystalline form of carbon which has been processed to produce carbon particles having relatively high porosity. This microcrystalline form of carbon is made up of six-member carbon rings separated by areas of disorganized carbon. The pore scheme adopted by the International Union of Pure and Applied Chemistry classifies pores according to their width as follows: micropores-pores which are less than about 2 nanometers in diameter, mesopores-pores which are about 2 to about 50 nanometers in diameter, and macropores-pores which are more than 50 nanometers in diameter.

Activated carbons having BET in the range of 450 to 3000 m$^2$/g are commercially available with various types of microporosity present in the activated carbon. Depending on the intended application, the activated carbon can vary as far as particle size, surface area, adsorption capacity for hydrocarbons, adsorption efficiency, porosity, pore size, etc. The carbon can be of single type or a blend of types. However, activated carbon suitable for the present invention has a BET surface area above about 2000 m$^2$/g, and about 50 percent of total pore volume of the activated carbon constituted by pores smaller than 4 nanometers in diameter. Preferably, the active carbon BET surface area is above 2500 m$^2$/g and about 80 percent of total pore volume is constituted by pores smaller than 4 nanometers in diameter.

One type of activated carbon suitable for use in practicing this invention is commercially available from The Kansai Coke & Chemicals Co. Ltd (Amagasaki, Japan) under the designation "Maxsorb." A particularly preferred variety of activated carbon is activated carbon designated as "Maxsorb 2400." Another type of suitable activated carbon is described in U.S. Pat. No. 4,082,694 to Wennerberg ("PX-21"; Amoco Corporation, Chicago, Ill.).

In making the carbon structures of this invention, the activated carbon preferably is in the form of a fine powder wherein about 50 percent of the particles have a size of 5–50 microns as measured by Coulter Counter technique. Commercially available carbons can be ground to smaller sizes by conventional methods if desired.

A critical component of the present activated carbon article is the silsesquioxane binder. In the present article, the silsesquioxane is present in an amount up to about 20 percent by weight, based on the weight of the composition. Preferably, in the present articles the silsesquioxane is present in an amount in the range of about 1 percent by weight to about 20 percent by weight, more preferably about 5 percent by weight.

Silsesquioxane compounds are oligomers composed of tetracyclosiloxane rings and can be represented as follows:

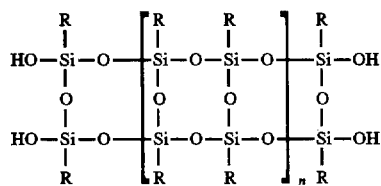

In the above formula, R can be the same group or a different group in any given polymer and is a substituted or unsubstituted alkyl group, an alkoxy group, an alkenyl group, or a phenyl group. Illustrative alkyl groups are the $C_1$ to $C_4$ alkyl groups such as methyl, ethyl, propyl, isopropyl, n-butyl, and the like. Illustrative substituted alkyl groups are the $C_1$ to $C_4$ hydroxyalkyl groups, the $C_1$ to $C_4$ haloalkyl groups, and the like. Exemplary compounds include polymethylsilsesquioxane,
polyphenylmethylsilsesquioxane,
polyphenylpropylsilsesquioxane,
polyphenylsilsesquioxane,
polyphenyldimethylsilsesquioxane,
polyphenylvinylsilsesquioxane.

Such silsesquioxanes have a plurality of consecutive SiO$_3$R—groups, forming SiO cages of "T" structures or ladders. The various rough geometries depend on the value of n in the above formula, which may vary from 2 to 12 or greater. A catalyst may be incorporated with the silsesquioxane to promote curing rate.

Suitable silsesquioxanes are commercially available from General Electric Company's Silicone Products Division (Waterford, N.Y.) and include hydroxy-terminated methylphenylsilsesquioxanes under the designations "SR240" and "SR165" and methoxy-terminated methylsilsesquioxanes under the designations "TPR178" and "TPR179." Silsesquioxane "SR240" is a preferred binder for present purposes. Tetrabutylphosphonium acid acetate (available from GE under the designation "SRC-11") and zirconium ethylhexanoate are preferred catalysts for these silsesquioxanes.

An optional but preferred component of the article of the present invention is a co-binder. Suitable co-binders are water insoluble polymers that cure at temperatures lower than the temperatures required to cure the silsesquioxane. The use of a co-binder permits a two stage curing schedule in which a partially cured article is stable for handling and shaping already after the first or initial stage. Polyvinyl acetate is a preferred co-binder and is commercially available from Union Carbide Corporation (Danbury, Conn.) under the designation "UCAR 379."

An important part of the method for preparing the temperature-resistant carbonaceous monolithic articles of the present invention is the wetting of the carbon particles with water. Water is used in an amount sufficient to fill a major portion of, preferably substantially all, the pores of the activated carbon particles. The carbon particles may be either prewetted or treated with an aqueous binder emulsion that allows the water to preferentially fill the small pores of the carbon particles. Prewetting is preferred, but not necessary.

The amount of water combined with the carbon particles is not critical and is determined primarily by the desired flow properties for the produced carbon slip. The resulting wetted carbon has slurry-like, paste-like or dough-like consistency that can be further modulated by the addition of a thickener, if desired.

The silsesquioxane binder is emulsified in an aqueous medium before combining with the wetted activated carbon. If necessary or desirable for emulsification, the binder can be first dissolved in a non-polar, organic, and therefore water-insoluble, solvent. Preferably, the amount of solvent used to form the resulting solution that is to be emulsified is minimized. Toluene has been used successfully for this function in toluene-to-silsesquioxane weight ratios ranging from about 1:2 to about 2:1 by weight.

The optional co-binder is emulsified in an aqueous medium in a manner similar to that of the silsesquioxane.

The aqueous emulsions produced in the foregoing manner are next combined with the wet or dry carbon to form a slip or slip mixture. At any step in the preparation of this slip mixture, emulsifying agents and rheological aids can be used to achieve the desired characteristics. For example, a surfactant can be used to aid in the emulsification of the silsesquioxane in water. The surfactant can be anionic, non-ionic, cationic, as well as amphoteric, depending upon the particular binder. In general anionic surfactants are preferred.

Thickeners can be combined with the wetted carbon to impart greater fluidity and strength to the slip mixture, as well as greater strength to the uncured, or green state structures formed from the slips. A number of thickeners are available that are suited for use in the present invention. These include water-soluble polymers such as methyl cellulose available from Aldrich Chemical Company Inc. (Milwaukee, Wis.), methyl cellulose ether available from Dow Chemical Co. (Midland, Mich.), and polyacrylic acid available from B.F. Goodrich (Akron, Ohio) under the designations "Carbopol ETD 2691" and "Carbopol 674."

The rheological properties of the slip mixture can be adjusted as required for the desired shaping method. A gel-like consistency for the slip mixture is usually desirable. Where the slip mixture is too thick, a thinner can be added. Suitable thinners are typically surfactants and include but are not limited to naphthalene sulfonates—available from W.R.Grace and Co. (Boca Raton, Fla.) under the designation "Daxad 19-L," 2,4,7,9-tetramethyl-5-decyne-4,7-diol—available from Air Products and Chemicals Inc. (Allentown, Pa.) under the designation "Surfynol GA," trisodium phosphate, sodium lauryl sulfate, and the like.

Where the slip mixture is too thin, a thickener such as methyl cellulose can be added to the carbon slip and improve green strength. While use of emulsifying agents and rheological aids sometimes requires an iterative approach, these additives are readily substitutable and are optional rather than critical aspects of the present invention. With regard to the emulsification step, for example, greater mixing intensity during emulsification can replace the use of a surfactant.

Various fillers also can be added to the original mixture in order to impart specific characteristics or properties to the shaped and/or dried structure. Fillers can be present in an amount up to about 25 percent by weight, preferably about 0.1 to about 5 percent by weight, of the total weight of the dried monolithic article. Formation of the admixture, with proper dispersion of the fillers is enhanced by addition of surfactants previously described. One preferred filer, chopped carbon fibers, can be added to reinforce the structure of the monolithic carbonaceous article. Suitable carbon fibers are available from Amoco Corporation under the designation "Thornel T-300".

To form a desired shape of the carbonaceous structure, the slip mixture may be cast in a mold and then cured by heating. After the slip mixture has been poured in a mould, a compression step can be used to dewater and densify the slip mixture. Alternatively, the slip can be poured into a plaster of Paris mold or other water absorbent material. In addition, a degassing step can be included, for example by subjecting the filled mold to vibration or a vacuum.

The filled mold is heated, preferably in stages. In the first stage, the mold is heated at temperatures up to about 120° C. to dry the slip and to set co-binders, if present. In the second stage, the temperature is gradually increased to levels sufficient to cure the silsesquioxane present. As tested, sufficient temperatures fall within the range from 150° C. to 200° C. If desired, the slip cast can be removed following the first stage and then heated outside the mold.

As an alternative to the molding, the slip mixture can be extruded into desired shapes using commercially available extruders. The produced extrudates then can be heated in a separate step to fully cure the silsesquioxane.

After curing, the monolithic carbonaceous structures of the present invention has several key features. Thermal stability, or temperature resistance, is an important feature. Structures according to the present invention retain good mechanical strength upon heating to 350° C. Furthermore, these structures have high adsorption capacity per unit volume when compared to prior art active carbon structures.

This high-adsorption capacity is obtained because the active carbon structures of the present invention have relatively high surface area, favorable pore distribution, and high bulk density. With these structures, available surface area exceeds 2000 $m^2/g$ of article and at least 50 percent of the pore volume is supplied by micropores. Also significantly, bulk densities in excess of 0.25 grams/$cm^3$ can be achieved.

Monolithic carbon structures constructed according to the present invention are particularly useful for ammonia adsorption in a refrigeration cycle. As required in this application, the adsorbent must have a high adsorbent capacity per unit volume as well as mechanical strength temperature cycles from as low as 0° C. to as high as 250° C., or higher.

A key benefit of the process of the present invention is the use of a silsesquioxane binder that causes minimal loss of retention volume or surface area. During fabrication, carbon pores are filled with water and thereby protected from plugging with binder. This protection is obtained because the silsesquioxane binder is applied as an emulsion in a water medium.

No high-cost firing or sintering step is required when practicing the present invention. Rather, curing is substantially complete upon drying the slip mixture at a temperature that does not exceed about 200° C. Despite the absence of a traditional firing or sintering step, the present monolithic carbonaceous structures so formed have high mechanical strength as well as thermal stability and structural integrity.

A further benefit of the method of the present invention is that the uncured slip mixtures can be made strong enough for handling after moderate heating and minimal use of environmentally unfriendly organic solvents.

The present invention is illustrated by the following examples.

EXAMPLE 1

Temperature-Resistant Monolithic Carbon Structures by Application of Silsesquioxane Binders In An Aqueous Emulsion Prewetted, high surface area activated carbon particles, were combined with an aqueous emulsion of a silsesquioxane binder and a polyvinyl acetate co-binder and cured to produce a monolithic carbon structure exhibiting good thermal stability and adsorption capacity.

The high surface area of the unbound activated carbon particles was retained inasmuch as carbon pores were pre-filled with water and the binder was in the form of an aqueous emulsion. Filled with water, pores were inaccessible to the binders.

In particular, the following ingredients were used:

| | |
|---|---|
| activated carbon (Amoco PX-21, 2500 m²/g; dried) | 50 g |
| vinyl acetate emulsion (50% solids) | 3 g |
| water addition | 30 g |
| methyl cellulose solution (0.5 wt %) | 20 g |
| silsesquioxanes (GE SR240) | 10 g |
| toluene (solvent) | 20 g |
| catalyst (GE SRC-11) | 50 µl |

Water was added to the dried carbon to fill the pores and protect them from toluene which was added later as part of the silsesquioxane emulsion. A carbon paste was obtained. The methyl cellulose solution was added to the carbon paste.

An emulsion was prepared by dissolving the silsesquioxanes in toluene and then pouring the obtained solution into an aqueous surfactant solution which was being stirred as the silsesquioxane/toluene solution was added. The catalyst was added to the silsesquioxane/toluene solution. The catalyzed silsesquioxane emulsion was then added to the carbon paste. Thereafter, the vinyl acetate emulsion was added and the resulting admixture was blended thoroughly. Additional water was added to achieve the desired fluidity of the produced slip.

The slip was poured into a mold and vibrated with a hand vibrator to remove air bubbles, and then gently compressed with a wafer or piston on top and bottom to partially dewater. The dewatered slip was gradually heated to 120° C. to remove water and to set the vinyl acetate binder. Thereafter the temperature was increased to 200° C. to activate the curing process for the silsesquioxane binder. The temperature was maintained for about one hour, and thereafter the mold was permitted to cool to ambient temperature. A temperature-resistant, microporous, monolithic carbonaceous block was obtained with a surface area of about 1990 m²/g of article or on a unit carbon basis, 2290 m²/g. The crush strength was 1100 psi.

EXAMPLE 2

Different Activated Carbon

An additional structure was prepared according to the procedure of Example 1 except that a different activated carbon was used and no additional water was added to the carbon slip. In particular, the following ingredients were used:

| | |
|---|---|
| activated carbon (Kansai Maxsorb 2200, dried) | 2.5 g |
| vinyl acetate emulsion (50% solids) | 0.15 g |
| methyl cellulose solution (0.5 wt %) | 0.25 g |
| silsesquioxanes (GE SR240) | 0.5 g |
| toluene (solvent) | 1 g |
| catalyst (GE SRC-11) | 2.5 µl |

The resulting activated carbon structure was evaluated for ammonia adsorption, achieving 600 mg NH₃/g carbon.

EXAMPLE 3

Effect of Binder Concentration

Activated carbon articles were prepared from mixtures of Kansai Maxsorb 2400 and Maxsorb 3000 particles in a manner similar to Example 2, above. The activated carbon particle mixture had an equivalent surface area of about 2600 m²/g. After curing, the compressive strength and the surface area of the produced articles were determined. The results are shown in Table 1.

TABLE 1

| Silsesquioxane Level, GE SR240 (wt %) | Vinyl Acetate Co-binder (wt %) | Compressive Strength at Room Temperature (psi) | Surface Area* (m²/g carbon) | Surface Area* (m²/g block) |
|---|---|---|---|---|
| 4 | 0 | 722 | 2573 | 2144 |
| 8 | 0 | 991 | 2548 | 2212 |
| 17 | 0 | 1699 | 2572 | 2057 |
| 0 | 3 | 722 | 2578 | 2501 |
| 0 | 6 | 1402 | 2393 | 2297 |
| 4 | 3 | 867 | 2322 | 2160 |
| 8 | 3 | 1558 | 2274 | 2024 |

*Iodine Number results, correlated per Proceedings of "Carbon 92," International Carbon Conference, Essen, Germany, June 1992.

EXAMPLE 4

Effect of Silsesquioxane Level On Surface Area

The effect of silsesquioxane binder level in the activated carbon structure on surface area was evaluated. Using a procedure similar to that of Example 1, a series of activated carbon structures were prepared with varied levels of silsesquioxane binder to determine the resulting effect on surface area retention. The samples were prepared from activated carbon particles having a surface area of about 2600 m²/g. Results are reported in Table 2.

TABLE 2

| Silsesquioxane Level (wt %) | Surface Area* (m²/g carbon) | Surface Area* (m²/g block) |
|---|---|---|
| 0 | 2611 | — |
| 4 | 2573 | 2144 |
| 8 | 2548 | 2212 |
| 17 | 2572 | 2057 |

*Iodine Number results, correlated per Proceedings of "Carbon 92," International Carbon Conference, Essen, Germany, June 1992.

Table 2 shows that the surface area per unit weight of carbon is generally unaffected by binder level. Of course, surface area per unit weight of the activated carbon structure decreases with increasing levels of binder because carbon is replaced by binder.

EXAMPLE 5

Effect of Binder Level And Fillers On Crush Strength

To determine the effect of silsesquioxane binder and vinyl acetate co-binder level on compressive strength, a number of cylindrical discs (0.62 in. diameter and 0.25 in. thick) were prepared using a procedure similar to that of Example 1. Compressive strength was measured by applying compressive force to the flat surfaces of the discs until fracture. Results are reported in the Table 3.

TABLE 3

| Silsesquioxane Level (wt %) | Vinyl Acetate Co-binder (wt %) | Compressive Strength at Room Temperature (psi) |
|---|---|---|
| 4 | 0 | 676 |
| 8 | 0 | 927 |

TABLE 3-continued

| Silsesquioxane Level (wt %) | Vinyl Acetate Co-binder (wt %) | Compressive Strength at Room Temperature (psi) |
|---|---|---|
| 17 | 0 | 1590 |
| 0 | 3 | 676 |
| 0 | 6 | 1312 |
| 4 | 3 | 811 |
| 8 | 3 | 1458 |

Table 3 shows that compressive strength generally increases with increasing silsesquioxane and vinyl acetate binder level.

To demonstrate the effect of carbon fiber fillers on the compressive strength of the activated carbon structures of the present invention, a sample was prepared with 8 percent silsesquioxane binder by weight, no co-binder, and 0.1 percent chopped carbon fibers. The sample structure exhibited a compressive strength exceeding 2600 psi, a significant increase over the compressive strength exhibited by a sample having the same level of silsesquioxane binder but lacking carbon fibers, 927 psi.

We claim:

1. A temperature-resistant microporous, monolithic carbonaceous article exhibiting substantially no change in compressive strength upon heating to 350° C. and consisting essentially of active carbon and a silsesquioxane binder present in an amount up to about 20 percent, based on the weight of the article, and said article having an open pore structure, a surface area in excess of about 2000 $m^2/g$ of article, a pore size distribution such that at least 50 percent of total pore volume is constituted by pores less than about 2 nanometers diameter and 80 percent of total pore volume by pores less than about 4 nanometers diameter, and a bulk density of at least about 0.25 grams/cubic centimeter.

2. The microporous, monolithic carbonaceous article in accordance with claim 1 wherein the silsesquioxane binder is selected from a group consisting of polymethylsilsesquioxane, polyphenylmethylsilsesquioxane, polyphenylpropylsilsesquioxane, polyphenylsilsesquioxane, polyphenyldimethylsilsesquioxane, polyphenylvinylsilsesquioxane, and mixtures thereof.

3. The microporous, monolithic carbonaceous article in accordance with claim 1 wherein said microporous, monolithic carbonaceous monolithic article further contains a polymeric co-binder.

4. The microporous, monolithic carbonaceous article in accordance with claim 3 wherein said polymeric co-binder is a vinyl acetate polymer.

5. The microporous, monolithic carbonaceous article in accordance with claim 1 and having a compressive strength of at least 500 psi.

6. The microporous, monolithic carbonaceous article in accordance with claim 1 wherein said microporous, monolithic carbonaceous monolithic article further contains an inorganic filler selected from the group consisting of silica, alumina, spinel, titania, zirconia, zeolite, nitride, boride, and carbon fiber; said filler being present in an amount up to 20 percent by weight, based on the weight of the article.

7. An aqueous carbon slip suitable for the preparation of an adsorbent article, said aqueous slip comprising porous carbonaceous particles with water-filled pores and a silsesquioxane binder in an aqueous emulsion; said binder being present in an amount up to about 20 percent by weight, based on the dry weight of the carbonaceous particles.

8. The aqueous carbon slip according to claim 7 further including an emulsifying agent.

9. The aqueous carbon slip according to claim 8 wherein said emulsifying agent is a surfactant.

10. The aqueous carbon slip according to claim 7 further including a thickener.

11. The aqueous carbon slip according to claim 10 wherein said thickener is a water-soluble polymer.

12. An aqueous carbon slip according to claim 7 further including a non-polar organic solvent.

13. A process for the manufacture of microporous, monolithic carbonaceous article which comprises:

combining activated carbon having a surface area of at least about 2000 $m^2/g$ with an aqueous emulsion of a silsesquioxane to form a carbon slip;

forming said carbon slip into a shaped article; and curing said shaped article.

14. The process according to claim 13 wherein said activated carbon is wet with water prior to combining with said aqueous emulsion of a silsesquioxane.

15. The process according to claim 14 wherein said activated carbon is treated with a thickener after wetting with water but prior to combining with said aqueous emulsion of a silsesquioxane.

16. The process according to claim 15 wherein said thickener is a water-soluble polymer.

17. The process according to claim 16 wherein said water-soluble polymer is a methyl cellulose.

18. The process according to claim 16 wherein said water-soluble polymer is a methyl cellulose ether.

19. The process according to claim 13 wherein said aqueous emulsion is prepared by dissolving said silsesquioxane in a non-polar organic solvent and emulsifying the resulting solution in an aqueous medium.

20. The process according to claim 19 wherein said non-polar organic solvent is toluene.

21. The process according to claim 13 wherein a surfactant is present in said aqueous medium.

22. The process according to claim 21 wherein said surfactant is an anionic surfactant.

23. The process according to claim 22 wherein said anionic surfactant is a naphthalene sulfonate.

24. The process according to claim 21 wherein said surfactant is a cationic surfactant.

25. The process according to claim 21 wherein said surfactant is an nonionic surfactant.

26. The process according to claim 25 wherein said nonionic surfactant is a 2,4,7,9-tetramethyl-5-decyne-4,7-diol.

* * * * *